United States Patent [19]

Tobias

[11] Patent Number: 4,629,557
[45] Date of Patent: Dec. 16, 1986

[54] PUMP TEST RING, COVER AND STRAINER AND METHOD OF PROVIDING A PRESSURE-TESTABLE PUMP

[75] Inventor: Samuel Tobias, Edison, N.J.

[73] Assignee: Hayward Industries, Inc., Elizabeth, N.J.

[21] Appl. No.: 755,476

[22] Filed: Jul. 16, 1985

[51] Int. Cl.⁴ .................. B01D 35/14; B01D 35/28
[52] U.S. Cl. .................................. 210/90; 210/162; 210/169; 210/232; 210/416.2; 210/541
[58] Field of Search ............... 210/541, 542, 232, 234, 210/169, 240, 85, 435, 90, 97, 162, 416.1, 416.2

[56] References Cited

U.S. PATENT DOCUMENTS 3,239,149  3/1966  Lindberg .......................... 210/169

Primary Examiner—Frank Sever
Attorney, Agent, or Firm—Lerner, David, Littenberg, Krumholz & Mentlik

[57] ABSTRACT

A test ring for a pump strainer is threadedly attached to both a housing and a cover of the strainer in such a manner that the cover can withstand relatively high internal pressure. When the test ring is detached from the cover, the cover is adapted for quick and easy removal from the strainer housing.

22 Claims, 3 Drawing Figures

PUMP TEST RING, COVER AND STRAINER AND METHOD OF PROVIDING A PRESSURE-TESTABLE PUMP

FIELD OF THE INVENTION

The present invention relates to a strainer cover for a pump, such as a swimming pool pump, and, more particularly, to such a cover which is strong enough to withstand relatively high internal pressure and yet is easy to remove.

BACKGROUND OF THE INVENTION

The housing of a pump strainer is usually under negative pressure (i.e., suction), thereby subjecting the strainer cover to the same type of force. The cover is usually under such negative pressure with two exceptions. First, if the pump is installed below water level and not running, a relatively low positive pressure is exerted on the cover. Most covers will withstand such relatively low positive pressure. Second, when the entire pool plumbing system, including the pump, is pressure tested at or during initial installation or at a later time for service or repair purposes, a relatively high positive pressure is exerted on the cover. Most strainer covers cannot withstand the relatively high pressure exerted during such testing, unless specially designed to do so.

In the past, pressure-testable pumps have employed two basic types of covers. One type employs a cover which is adapted to be threadedly attached to the strainer housing. This type of cover complicates normal operation (i.e., when pressure testing is not required), because the threaded attachment between the cover and the strainer housing makes it difficult to remove the cover, which in connection with the normal operation of the pump would be removed about once a week, daily, or even several times a day depending upon the application.

The other type of pressure testable pump employs a cover which is clamped onto the strainer housing by screw-type hand knobs. However, in order to make this type of pump pressure testable, the cover must be made from iron or a suitable metal, which is not corrosion resistant and/or is very expensive.

SUMMARY OF THE INVENTION

In accordance with the present invention, a strainer cover for a pump can be used in two different modes. One made is a pressure-testable mode in which the cover must withstand relatively high positive pressure (i.e., about 40 psi). The other mode is a nonpressure-testable mode in which the cover is not subjected to high positive pressure, such as that experienced during pressure testing. When used in a nonpressure-testable mode, the cover is designed for quick and easy removal from the strainer housing.

More particularly, by applying a test ring to the cover, the cover can be adapted for threaded attachment to the strainer housing. The threaded attachment between the cover and the housing permits the cover to withstand the relatively high positive pressure experienced when the pump is used in its pressure-testing mode. During normal operation, the test ring can be removed from the cover to permit the cover to be attached to the strainer housing using a conventional clamping mechanism, such as screw-type hand knobs, designed for quick and easy removal of the cover.

In one embodiment, the test ring is threadedly attached to both the strainer housing and the cover. So as to facilitate the application of the test ring to the cover and/or the strainer housing, the test ring is provided with ribs which can be manually gripped by an individual, who then rotates the test ring to screw it onto the cover and/or the strainer housing.

BRIEF DESCRIPTION OF THE DRAWINGS

For a better understanding of the present invention, reference is made to the following detailed description of an exemplary embodiment considered in conjunction with the accompanying drawings, in which.

DESCRIPTION OF THE EXEMPLARY EMBODIMENT

Figure 1:
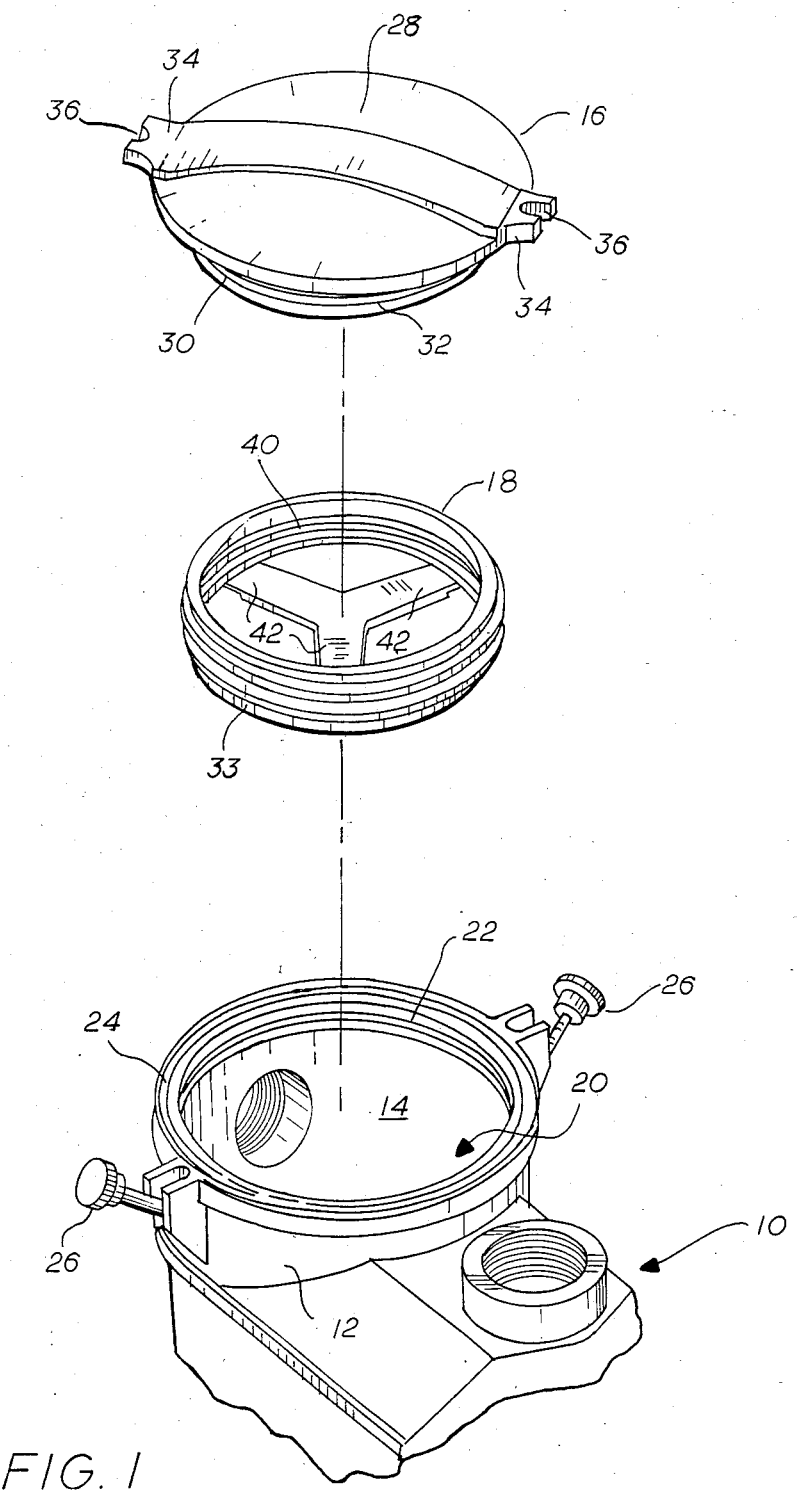
FIG. 1 is an exploded perspective view of a pump strainer, including a cover and testing ring therefor, constructed in accordance with the present invention.

Referring to FIG. 1, a pump 10 includes a strainer 12 having a generally cylindrical housing 14, a cover 16 and a test ring 18. The housing 14 has an open end 20 which includes internal threads 22 and a resilient O-ring 24 adapted to form a water-tight seal between the strainer housing 14 and the cover 16. Screw-type hand knobs 26 are pivotally attached to the exterior of the strainer housing 14 for a purpose to be explained hereinafter in conjunction with the description of the operation of the pump 10.

The cover 16, which is made from polymeric material, includes a domed top 28, which extends over the open end 20 of the strainer housing 14, and a neck 30, which extends into the open end 20 of the strainer housing 14. External threads 32 are provided on the neck 30 of the cover 16. Ears 34, each of which includes a slot 36, extend radially outward from opposite sides of the cover 16 for a purpose to be explained hereinafter in conjunction with the description of the operation of the pump 10.

The test ring 18, which is also made from polymeric material, includes external threads 38, which extend around the outer periphery of the test ring 18, and internal threads 40, which extend around the inner periphery of the test ring 18. The external threads 38 are engagable with the internal threads 22 of the strainer housing 14, while the internal threads 40 are engagable with the external threads 32 on the neck 30 of the cover 16. Ribs 42 extend radially inward from the test ring 18 meeting at a point which is coincident with the center of the test ring 18.

Figure 2:
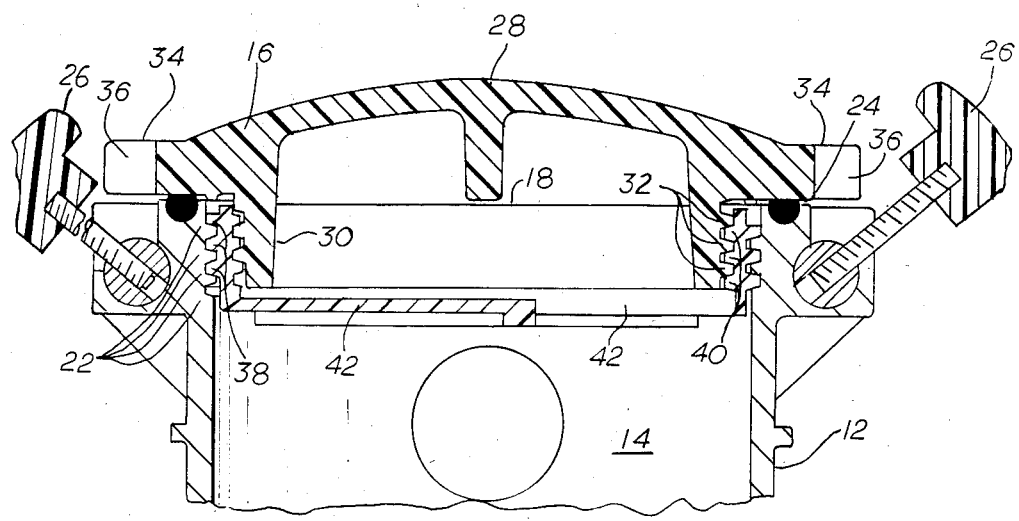
FIG. 2 is a cross-sectional view of the pump strainer shown in FIG. 1, the strainer being adapted for operation in a pressure-testable mode.

With reference to FIG. 2, when the pump 10 is to be operated in a pressure-testable mode, the test ring 18 is threadedly attached to the strainer housing 14 and to the cover 16 by, for instance, first screwing the test ring 18 onto the cover 16 and then screwing the test ring and cover assembly onto the strainer housing 14. The ribs 42 on the test ring 18 facilitate the application of the test ring 18 to the cover 16 by providing gripping surfaces for an individual's fingers. Alternatively, the test ring 18 can be screwed into the strainer housing 14, the ribs 42 facilitating such insertion, and then the cover 16 can be screwed into the test ring 18. Because the threaded connection between the strainer housing 14 and the cover 16 is strong enough to withstand the relatively high positive pressure (i.e., about 40 psi) experienced during pressure testing, it is not necessary to engage the hand knobs 26 in the slots 36 of the ears 34 on the cover 16. After a pressure-testing operation, the cover 16 and the test ring 18 can be removed from the strainer housing 14 individually or as a unit.

Figure 3:
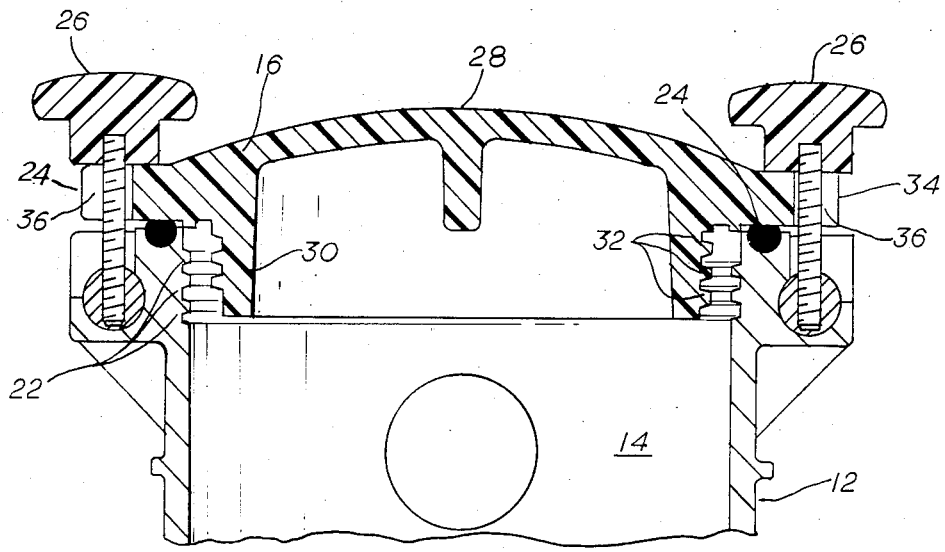
FIG. 3 is a cross-sectional view of the pump strainer shown in FIG. 1, the strainer being adapted for operation in a nonpressure-testable mode.

Referring now to FIG. 3, when the pump 10 is to be operated in a nonpressure-testable mode (e.g., during daily or otherwise regular operation), the test ring 18 is not used to attach the strainer housing 14 to the cover 16. Rather, the hand knobs 26 are pivoted into a mating relationship with the slots 36 of the ears 34 on the cover 16 and then tightened so as to clamp the cover 16 to the strainer housing 14. Because of the neck 30 of the cover 16 is spaced from the strainer housing 14, the external threads 32 of the cover 16 do not engage the internal threads 22 of the housing 14, whereby there is no threaded attachment between the cover 16 and the housing 14. Although the cover 16 cannot withstand the relatively high positive pressure experienced during pressure testing, it is capable of withstanding relatively low positive pressure (i.e., in the neighborhood of 8 psi), while permitting quick and easy removal.

It will be understood that the embodiment described herein is merely exemplary and that a person skilled in the art may make many variations and modifications without departing from the spirit and scope of the invention. For instance, the hand knobs 26 could be replaced by a bayonnet-type lock. All such variations and modifications are intended to be included within the scope of the invention as defined in the appended claims.

I claim:

1. A test ring for a pump which includes a strainer, comprising first attaching means for threadedly and removably attaching said test ring to a housing of said strainer and second attaching means for threadedly and removably attaching said test ring to a cover of said strainer, said first and second attaching means cooperating to enable said test ring to threadedly attach said strainer cover to said strainer housing when said pump is to be used in a pressure-testable mode in which said strainer cover must withstand relatively high positive pressure and to enable said test ring to be removed from said strainer housing and said strainer cover when said pump is to be used in a nonpressure-testable mode in which said strainer cover is not subjected to high positive pressure.

2. A test ring according to claim 1, wherein said first attaching means includes a first set of threads provided on an outer peripheral surface of said test ring and said second attaching means includes a second set of threads provided on an inner peripheral surface of said test ring.

3. The test ring of claim 1, further comprising rotating means for rotating said test ring about its center to threadedly attach said test ring to said strainer cover or to said strainer housing.

4. The test ring of claim 3, wherein said rotating means includes a plurality of ribs extending radially inward from said inner peripheral surface of said test ring, said ribs meeting at a point which is substantially coincident with the center of said test ring.

5. The test ring of claim 1, wherein said test ring is made from polymeric material.

6. In combination, a pump which includes a strainer having a housing provided with a first set of threads and a cover provided with a second set of threads, and a test ring, including a third set of threads engagable with said first set of threads so as to threadedly and removably attach said test ring to said strainer housing and a fourth set of threads engagable with said second set of threads so as to threadedly and removably attach said test ring to said strainer cover, said first, second, third and fourth sets of threads cooperating to enable said test ring to threadedly attach said strainer cover to said strainer housing when said pump is to be used in a pressure-testable mode in which said strainer cover must withstand relatively high positive pressure and to enable said test ring to be removed from said strainer housing and said strainer cover when said pump is to be used in a nonpressure-testable mode in which said strainer cover is not subjected to high positive pressure.

7. The combination of claim 6, wherein said strainer cover includes a neck which extends into said strainer housing, said neck being spaced from said strainer housing and including said second set of threads.

8. The combination of claim 7, wherein said third set of threads is provided on an outer peripheral surface of said test ring, said third set of threads being releasably engagable with said first set of threads, and wherein said fourth set of threads is provided on an inner peripheral surface of said test ring, said fourth set of threads being releasably engagable with said second set of threads, whereby said strainer cover can be detached from said test ring to permit said strainer cover to be applied to said strainer housing independently of said test ring.

9. The combination of claim 6, wherein said test ring includes rotating means for rotating said test ring about its center to threadedly attach said test ring to said strainer housing or to said strainer cover.

10. The combination of claim 9, wherein said rotating means includes a plurality of ribs extending radially inward from said inner peripheral surface of said test ring, said ribs meeting at a point which is coincident with the center of said test ring.

11. The combination of claim 6, wherein said strainer cover includes receiving means for receiving screw-type hand knobs adapted to clamp said strainer cover to said strainer housing, whereby said strainer cover can be attached to said strainer housing when said test ring has been detached from said strainer cover.

12. The combination of claim 6, wherein said strainer cover and said testing ring are made from polymeric material.

13. A method of making a nonpressure-testable pump pressure testable, which pump includes a strainer housing and a strainer cover, comprising the steps of threadedly and removably attaching a test ring to said strainer housing and threadedly and removably attaching said test ring to said strainer cover such that said test ring threadedly attaches said strainer cover to said strainer housing when said pump is to be used in a pressure-testable mode in which said strainer cover must withstand relatively high positive pressure and such that said test ring can be removed from said strainer housing and said strainer cover when said pump is to be used in a nonpressure-testable mode in which said strainer cover is not subjected to high positive pressure.

14. The method of claim 13, wherein said test ring is threadedly attached to said strainer housing before said test ring is threadedly attached to said strainer cover.

15. The method of claim 13, wherein said test ring is threadedly attached to said strainer cover before said test ring is threadedly attached to said strainer housing.

16. A strainer for a pressure-testable pump, comprising a strainer housing having an open end, a strainer cover sized and shaped so as to extend over said open end of said strainer housing, a test ring sized and shaped so as to be positioned in said open end of said strainer housing, first attaching means for threadedly and removably attaching said test ring to said strainer housing and second attaching means for threadedly and removably attaching said test ring to said strainer cover, said first and second attaching means cooperating to enable said test ring to threadedly attach said strainer cover to said strainer housing when said pump is to be used in a pressure-testable mode in which said strainer cover must withstand relatively high positive pressure and to enable said test ring to be removed from said strainer housing and said strainer cover when said pump is to be used in a nonpressure-testable mode in which said strainer cover is not subjected to high positive pressure.

17. The pump strainer of claim 16, wherein said first attaching means includes a first set of threads provided on an outer peripheral surface of said test ring and a second set of threads provided inside said strainer housing, said first set of threads releasably engaging said second set of threads, and wherein said second attaching means includes a third set of threads provided on an inner peripheral surface of said test ring and a fourth set of threads provided on said strainer cover, said third set of threads releasably engaging said fourth set of threads, whereby said strainer cover can be detached from said test ring to permit said strainer cover to be applied to said strainer housing independently of said test ring.

18. The pump strainer of claim 16, wherein said test ring includes rotating means for rotating said test ring about its center to threadedly attach said test ring to said strainer housing or to said strainer cover.

19. The pump strainer of claim 18, wherein said rotating means includes a plurality of ribs extending radially inward from said inner peripheral surface of said test ring, said ribs meeting at a point which is coincident with the center of said test ring.

20. The pump strainer of claim 16, wherein said strainer cover includes receiving means for receiving screw-type hand knobs adapted to clamp said strainer cover to said strainer housing, whereby said strainer cover can be attached to said strainer housing when said test ring has been detached from said strainer cover.

21. The pump strainer of claim 16, wherein said strainer cover and said test ring are made from polymeric material.

22. The pump strainer of claim 16, wherein said fourth set of threads is incapable of engaging said second set of threads.

* * * * *

UNITED STATES PATENT AND TRADEMARK OFFICE
CERTIFICATE OF CORRECTION

PATENT NO. : 4,629,557

DATED : December 16, 1986

INVENTOR(S) : Samuel Tobias

It is certified that error appears in the above-identified patent and that said Letters Patent is hereby corrected as shown below:

```
Column 1, line 51, "made" should read --mode--.
Column 2, line 18, "testing" should read --test--.
Column 4, line 50, "testing" should read --test--.
```

Signed and Sealed this

Fourteenth Day of April, 1987

Attest:

DONALD J. QUIGG

*Attesting Officer*

*Commissioner of Patents and Trademarks*